(12) United States Patent
Chen (10) Patent No.: US 12,102,950 B1
(45) Date of Patent: Oct. 1, 2024

(54) FOLDABLE FILTER HOUSING FOR AIR CONDITIONING

(71) Applicant: Wifeb Trading Co., Limited, Hong Kong (HK)

(72) Inventor: Wei Chen, Guangdong (CN)

( * ) Notice: Subject to any disclaimer, the term of this patent is extended or adjusted under 35 U.S.C. 154(b) by 0 days.

(21) Appl. No.: 18/671,328

(22) Filed: May 22, 2024

(51) Int. Cl.
    *B01D 46/00* (2022.01)
    *B01D 46/121* (2022.01)
    *B01D 46/52* (2006.01)
    *F24F 8/108* (2021.01)

(52) U.S. Cl.
    CPC ....... *B01D 46/0016* (2013.01); *B01D 46/521* (2013.01); *F24F 8/108* (2021.01); *B01D 46/121* (2022.01); *B01D 2201/4038* (2013.01); *B01D 2265/028* (2013.01); *B01D 2265/04* (2013.01); *B01D 2265/05* (2013.01); *B01D 2279/50* (2013.01)

(58) Field of Classification Search
    None
    See application file for complete search history.

(56) References Cited

U.S. PATENT DOCUMENTS

| | | | | |
|---|---|---|---|---|
| 2,297,629 | A * | 9/1942 | Meyer | A47G 5/00 16/366 |
| 2,590,744 | A * | 3/1952 | Woodbury | A47G 1/14 40/733 |
| 3,250,063 | A * | 5/1966 | Andrews | B01D 46/10 55/504 |
| 8,834,592 | B1 * | 9/2014 | Dimicelli | B01D 46/0036 55/497 |
| 10,245,542 | B2 * | 4/2019 | Knuckles | B01D 46/0016 |
| 10,307,703 | B1 * | 6/2019 | Dearden | B01D 46/121 |
| 10,603,616 | B1 * | 3/2020 | Nance | B01D 46/0002 |
| 2003/0159415 | A1 * | 8/2003 | Parker | B01D 46/0006 55/506 |
| 2005/0138906 | A1 * | 6/2005 | Kubokawa | B01D 46/523 55/497 |
| 2008/0148698 | A1 * | 6/2008 | Nowak | B01D 46/0016 55/493 |
| 2015/0277373 | A1 * | 10/2015 | Yamaguchi | B01D 46/10 55/495 |
| 2017/0151522 | A1 * | 6/2017 | Knuckles | B01D 46/0016 |
| 2017/0182445 | A1 * | 6/2017 | Zhang | B01D 46/521 |
| 2017/0266597 | A1 * | 9/2017 | Winters | B01D 46/0005 |
| 2021/0197112 | A1 * | 7/2021 | Barry | B01D 46/522 |

(Continued)

FOREIGN PATENT DOCUMENTS

| | | | | |
|---|---|---|---|---|
| DE | 102022203975 | A1 * | 10/2023 | ............. B01D 46/10 |
| JP | 2015192947 | A * | 11/2015 | ......... B01D 46/0002 |

(Continued)

OTHER PUBLICATIONS

WO-2022005261-A1 (Year: 2024).*

*Primary Examiner* — Brit E. Anbacht (57) ABSTRACT

A foldable filter housing for an air conditioning, including two outer frames stacked on each other, and each of the two outer frames includes two casings and a connecting portion connecting the two casings. The connecting portion is resilient to enable the two casings to fold relative to each other centered on the connecting portion. The two outer frames are detachably connected, and an accommodating space is defined between the two outer frames for receiving a filter cartridge.

12 Claims, 12 Drawing Sheets

(56) References Cited

U.S. PATENT DOCUMENTS

| | | | |
|---|---|---|---|
| 2022/0314152 A1* | 10/2022 | Stender | F24C 15/2035 |
| 2023/0271125 A1* | 8/2023 | Choi | B01D 46/10 |
| | | | 55/495 |
| 2023/0302389 A1* | 9/2023 | Langerak | B01D 46/4227 |
| 2024/0082774 A1* | 3/2024 | Jolliffe | B01D 46/58 |
| 2024/0109016 A1* | 4/2024 | Wu | B01D 46/10 |

FOREIGN PATENT DOCUMENTS

| | | | | |
|---|---|---|---|---|
| WO | WO-2017053341 A1 * | 3/2017 | | B01D 46/0002 |
| WO | WO-2020076751 A1 * | 4/2020 | | B01D 46/0016 |

* cited by examiner

FOLDABLE FILTER HOUSING FOR AIR CONDITIONING

TECHNICAL FIELD

The present disclosure relates to the technical field of air conditioning filters, and more specifically to a foldable filter housing for an air conditioning.

BACKGROUND

An air conditioning filter housing (i.e. the housing of the filter of the air conditioning) is an external protective layer of the air conditioning filter, which is usually made of plastic or metal, for protecting the filter from dust, dirt, and other impurities, as well as serving as an aesthetic decoration. Different types of air conditioning filter housings may be made of different materials, for example, some may be made of plastic, some may be made of metal, and some may be made of composite materials.

The existing air conditioning filter housing is usually a one-piece type, of which the overall volume is large, and thus the housing is not convenient to carry and will take up a large amount of space being when transported. Moreover, for the existing filter housing, the housing is also required to be replaced when replacing the filter, i.e., the housing cannot be reused.

The foregoing is only intended to assist in understanding the technical solution of the present disclosure, and does not mean that the foregoing is recognized as prior art.

SUMMARY OF THE DISCLOSURE

In view of the above problems, the present disclosure proposes a foldable filter housing for an air conditioning, aiming to solve the technical problem that the air conditioning filter housing is inconvenient to be transported and cannot be reused due to its large overall volume.

To realize the above purpose, the proposed foldable filter housing includes two outer frames stacked on each other; wherein each of the two outer frames includes two casings and a connecting portion connecting the two casings, and the connecting portion is resilient to enable the two casings to fold relative to each other centered on the connecting portion; wherein the two outer frames are detachably connected; an accommodating space is defined between the two outer frames for receiving a filter cartridge.

In some embodiments, the connecting portion is a soft rubber; each of the two casings includes a main casing and a border portion distributed in a first direction; the border portion is connected to a side edge of the main casing, and the connecting portion is integrally injection molded with the border portion.

In some embodiments, a thickness of the border portion is less than a thickness of the side edge of the main casing; the border portion defines an adhesive-hanging hole, and the connecting portion is integrally injection molded with the border portion and fills the adhesive-hanging hole.

In some embodiments, the border portion is in a stepped shape to include a thick-walled portion and a thin-walled portion; the main casing, the thick-walled portion, and the thin-walled portion are connected sequentially in the first direction.

In some embodiments, the thick-walled portion defines the adhesive-hanging hole, the adhesive-hanging hole being a stepped hole.

In some embodiments, the adhesive-hanging hole includes a large-hole segment and a small-hole segment distributed along a penetration direction, a hole diameter of the large-hole segment being greater than a hole diameter of the small-hole segment, and the large-hole segment being notched along the first direction through the thick-walled portion.

In some embodiments, the two casings are arranged at an interval at least at the border portion, and the connecting portion defines a folding slot corresponding to the interval, the folding slot extending along a rotation axis of the two casings.

In some embodiments, the filter cartridge includes a plurality of filter units, the plurality of filter units forming a pleated shape in sequence; each of the two outer frames is arranged with a support portion in the accommodating space, the support portion facing a most marginal one of the plurality of filter units and extending into between adjacent two of the plurality of filter units.

In some embodiments, the support portion is in a form of a plate; or the adjacent two of the plurality of filter units are connected to form a V-shape, and the support portion includes two support beveled surfaces opposite to each other; wherein the two support beveled surfaces are arranged facing the adjacent two of the plurality of filter units, and an inclined direction of each of the two support beveled surfaces is same as an inclined direction of a corresponding filter unit.

In some embodiments, each of the two outer frames has an unfolded state and a folded state; the two casings are unfolded relative to each other in the unfolded state, and the two casings are folded relative to each other centered on the connecting portion in the folded state; one of the two casings is arranged with a clamping protrusion, and the other of the two casings defines a clamping slot; in the unfolded state, the clamping protrusion is snap coupled with the clamping slot; in the folded state, the clamping protrusion and clamping slot are disengaged.

In some embodiments, one of the two outer frames is a first outer frame, and the other of the two outer frames is a second outer frame; the first outer frame defines a mounting slot, and an opening of the mounting slot has a diameter increasing toward outside; the second outer frame is configured to close and cover the opening of the mounting slot to define the accommodating space; a side slot wall of the mounting slot includes a fixing protrusion; the second outer frame defines a fixing slot at a position corresponding to the fixing protrusion; the fixing protrusion is arranged with a guide beveled surface facing the opening.

In some embodiments, the mounting slot is arranged with a limit plate, and a side of the limit plate facing the second outer frame defines a limit notch; the second outer frame is arranged with an insertion plate, and the insertion plate is socket with the limit notch in condition of the second outer frame being covered with the first outer frame.

In the present disclosure, the foldable filter housing includes two outer frames stacked on each other, and each of the two outer frames includes two casings and a connecting portion connecting the two casings. The connecting portion is resilient to enable the two casings to fold relative to each other centered on the connecting portion, thereby saving space, and making it easy to carry when transporting. The two outer frames are detachably connected, and an accommodating space is defined between the two outer frames for receiving a filter cartridge. When it is necessary to replace the filter cartridge, it is only necessary to take out one of the outer frames, mount the filter cartridge, and then mount the outer frame back. The proposed filter housing can be reused to reduce costs and save resources.

BRIEF DESCRIPTION OF THE DRAWINGS

To illustrate the technical solutions of the embodiments of the present disclosure more clearly, the accompanying drawings of the embodiments will be briefly described below, and it will be apparent that the accompanying drawings in the following description relate only to some embodiments of the present disclosure and other drawings may be obtained from these drawings by those skilled in the art without creative labor.

The realization of the purpose, functional features, and advantages of the present disclosure will be further described in conjunction with the embodiments and with reference to the accompanying drawings.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without creative labor fall within the scope of the present disclosure. In addition, the technical solutions between various embodiments can be combined with each other, but it must be based on the fact that those skilled in the art is able to realize it. When the combination of the technical solutions appears to be contradictory or unattainable, it should be considered that the combination of such technical solutions does not exist, and is not included in the scope claimed by the present disclosure.

It should be noted that when the embodiments of the present disclosure involve directional indications (such as up, down, left, right, forward, back . . . ), the directional indications are only intended to explain a relative positional relationship, a movement, etc. between the various components in a particular attitude. When the particular attitude changes, the directional indications are also changed accordingly.

In addition, when the embodiments of the present disclosure contain descriptions involving "first", "second", etc., the descriptions of "first", "second", etc. are intended only for descriptive purposes, and are not to be construed as indicating or implying their relative importance or implicitly specifying the number of the indicated technical features. That is, a feature defined as "first" or "second" may include at least one such feature either explicitly or implicitly. In addition, the meaning of "and/or" in the whole text is to include three concurrent solutions. For example, "A and/or B" includes an A solution, a B solution, and a solution in which A and B are satisfied at the same time.

The present disclosure proposes a foldable filter housing for an air conditioning.

| \multicolumn{6}{c|}{Reference numerals} | | | | | |
| --- | --- | --- | --- | --- | --- |
| No. | Name | No. | Name | No. | Name |
| 100 | foldable filter housing for air conditioning | 12 | connecting portion | 17 | mounting slot |
| 10 | outer frame | 121 | folding slot | 172 | fixing protrusion |
| 11 | casing | 13 | filter cartridge | 1721 | guide beveled surface |
| 111 | main casing | 131 | filter unit | 173 | limit plate |
| 112 | border portion | 132 | mounting lug | 18 | fixing base |
| 1121 | adhesive-hanging hole | 14 | fixing slot | 19 | fixing slot |
| 1122 | thick-walled portion | 15 | support portion | 20 | mounting base |
| 1123 | thin-walled portion | 151 | support block | 30 | limit base |
| 1124 | large-hole segment | 152 | support base | 31 | limit plate |
| 1125 | small-hole segment | 1521 | support beveled surface | 32 | tab |
| 113 | clamping protrusion | 16 | insertion plate | 33 | avoidance notch |
| 114 | clamping slot | | | | |

In the embodiments of the present disclosure, with reference to FIGS. 1 to 3, 7, and 8, the foldable filter housing 100 includes two outer frames 10 stacked on each other; each of the two outer frames 10 includes two casings 11 and a connecting portion 12 connecting the two casings 11, and the connecting portion 12 is resilient to enable the two casings 11 of a same outer frame 10 to fold relative to each other centered on the connecting portion 12. The connecting portion 12 may be soft or rigid. In some embodiments, the connecting portion 12 is made of rigid plastic and the connecting portion 12 is provided with a slit, where the slit facilitates elastic deformation of the rigid plastic, which in turn facilitates folding between the casings 11. The two outer frames 10 are detachably connected. The detachable connection facilitates the user to replace a filter cartridge 13, thereby improving the utilization of the foldable filter housing 100 for an air conditioning. An accommodating space is defined between the two outer frames 10 for receiving the filter cartridge 13.

Figure 1:
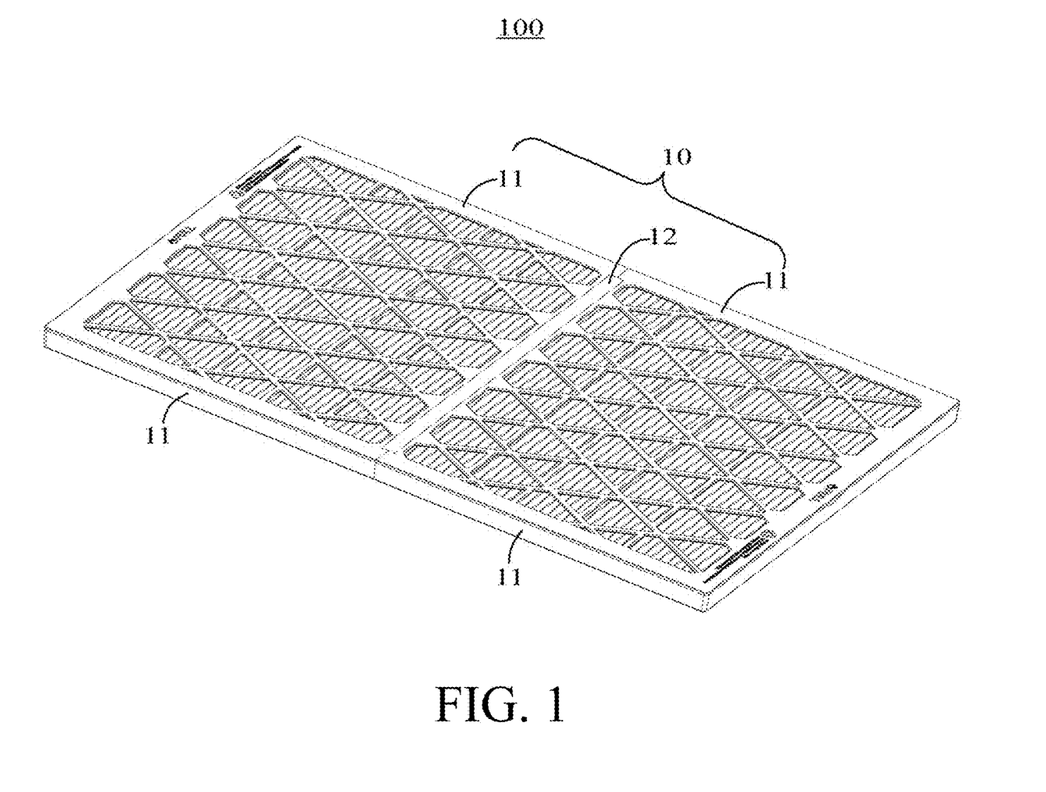
FIG. 1 is a structural schematic view of a foldable filter housing for an air conditioning according to some embodiments of the present disclosure.
Figure 2:
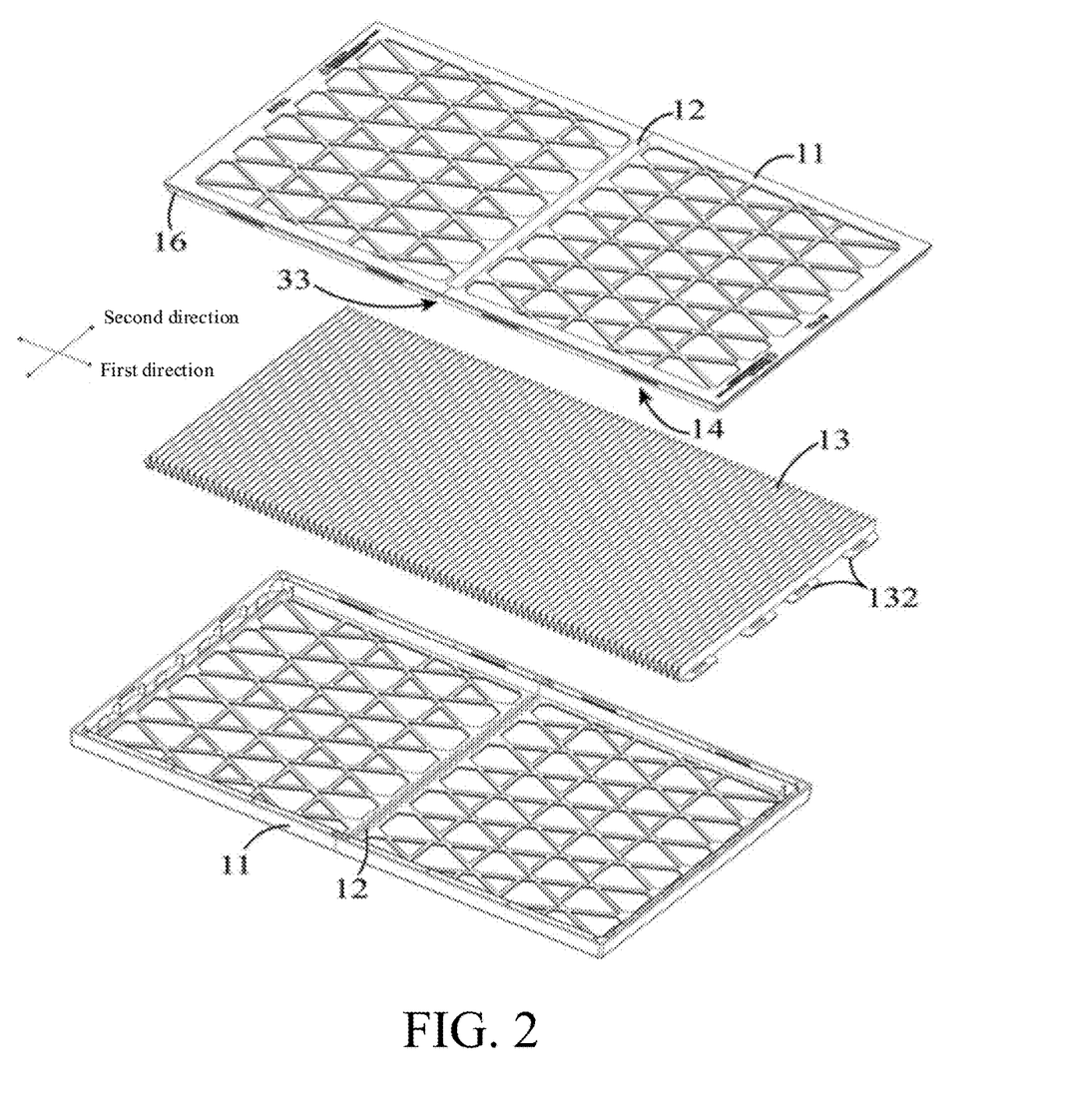
FIG. 2 is an exploded view of the filter housing in FIG. 1.
Figure 3:
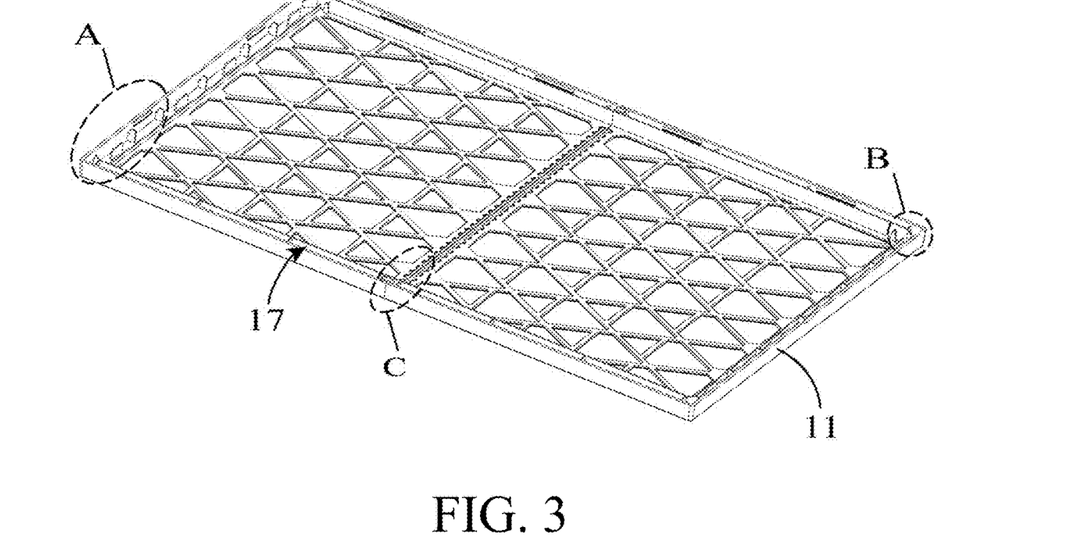
FIG. 3 is a structural schematic view of an outer frame in FIG. 2.

In the present disclosure, two casings 11 are connected through the connecting portion 12, and the connecting portion 12 can generate elastic deformation, such that the casings 11 can be folded and stored, which may save space when being transported and be convenient to carry. The connecting portion 12 connects the two casings 11 to form a single outer frame 10, and the two outer frames 10 are stacked to define an accommodating space for receiving the filter cartridge 13. When it is necessary to replace the filter cartridge 13, it is only necessary to take out one of the outer frames 10, mount the filter cartridge 13, and then mount the outer frame 10 back. The proposed filter housing 100 can be reused to reduce costs and save resources.

Further, referring to FIG. 2, FIG. 3, FIG. 6, FIG. 9, and FIG. 10, the connecting portion 12 is a soft rubber. The soft rubber includes, but is not limited to, butyl rubber, silicone, neoprene, and polyurethane. The soft material has better drop resistance and elastic recovery, which may avoid damage and breakage of the connecting portion 12 caused by transport bumps. Each casing 11 includes a main casing 111 and a border portion 112 distributed in a first direction, where the border portion 112 is connected to a side edge of the main casing 111, and the connecting portion 12 is integrally injection molded with the border portion 112. The integral injection molding can connect the connecting portion 12 and the border portion 112 into a single unit directly, reducing the use of traditional manufacturing processes such as welding and screws, thus effectively avoiding loosening, cracking, and other structural safety problems between components. This seamless connection makes the overall structure more solid and stable.

Figure 6:
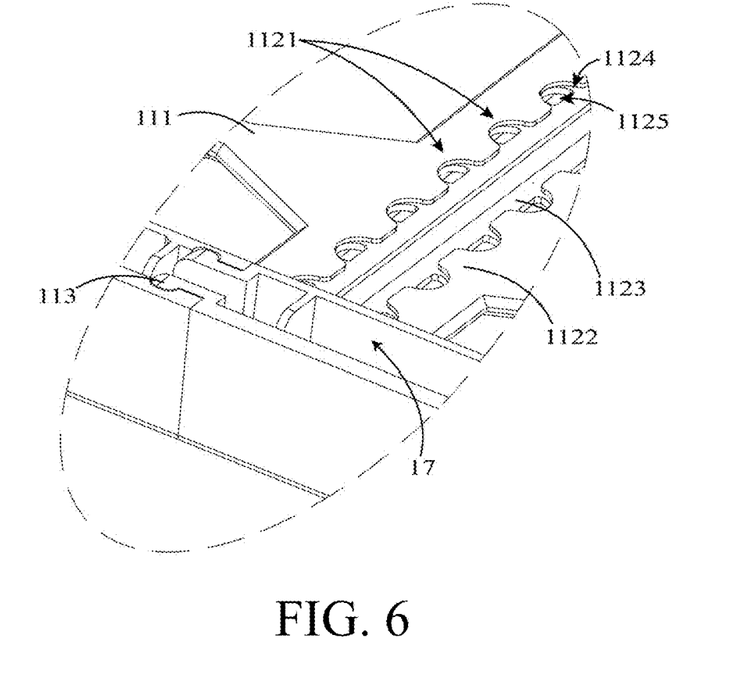
FIG. 6 is a partially enlarged view at area C in FIG. 3.
Figure 8:
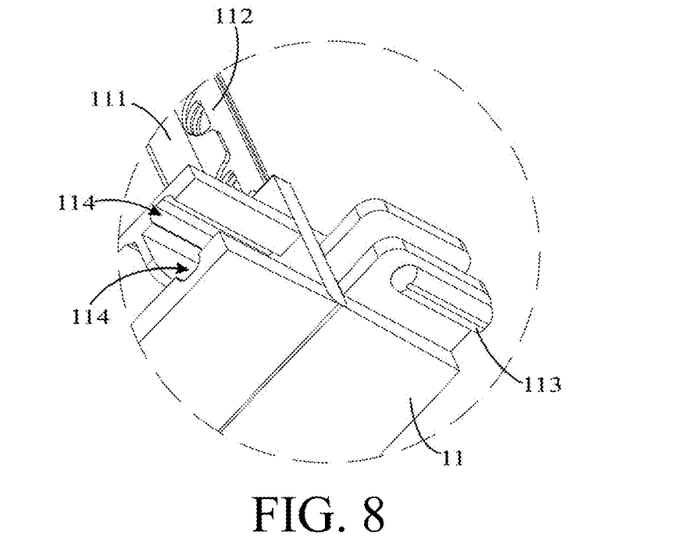
FIG. 8 is a partially enlarged view at area D in FIG. 7.
Figure 9:
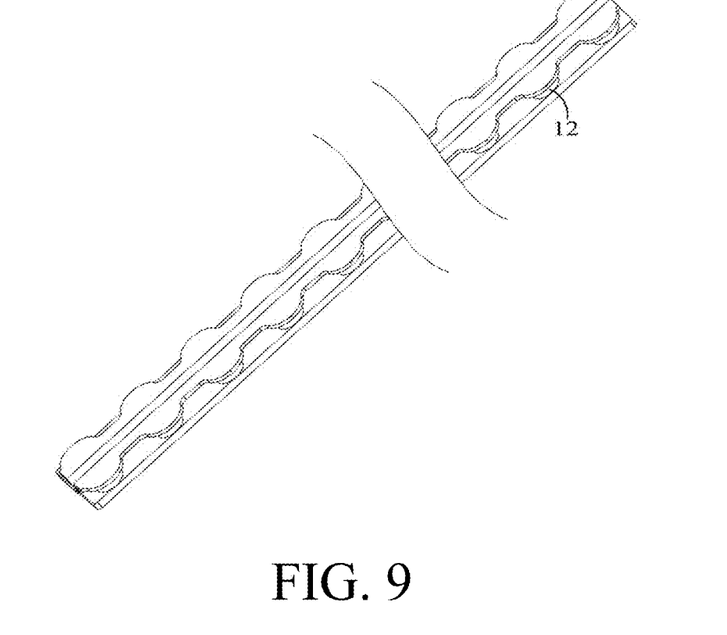
FIG. 9 is a structural schematic view of a connecting portion in FIG. 1 according to some embodiments of the present disclosure.
Figure 10:
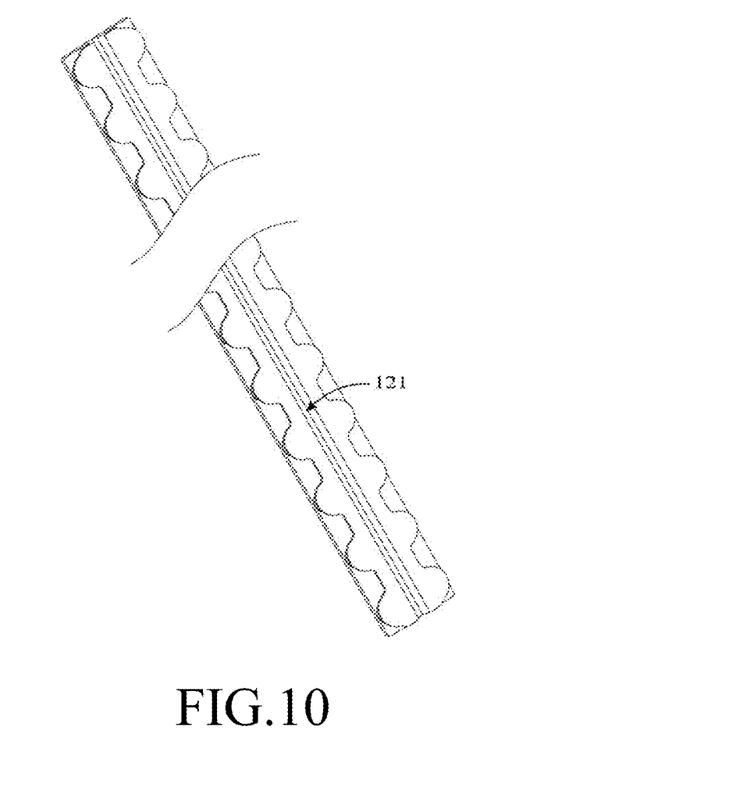
FIG. 10 is a structural schematic view of the connecting portion in FIG. 9 in another view.
Figure 11:
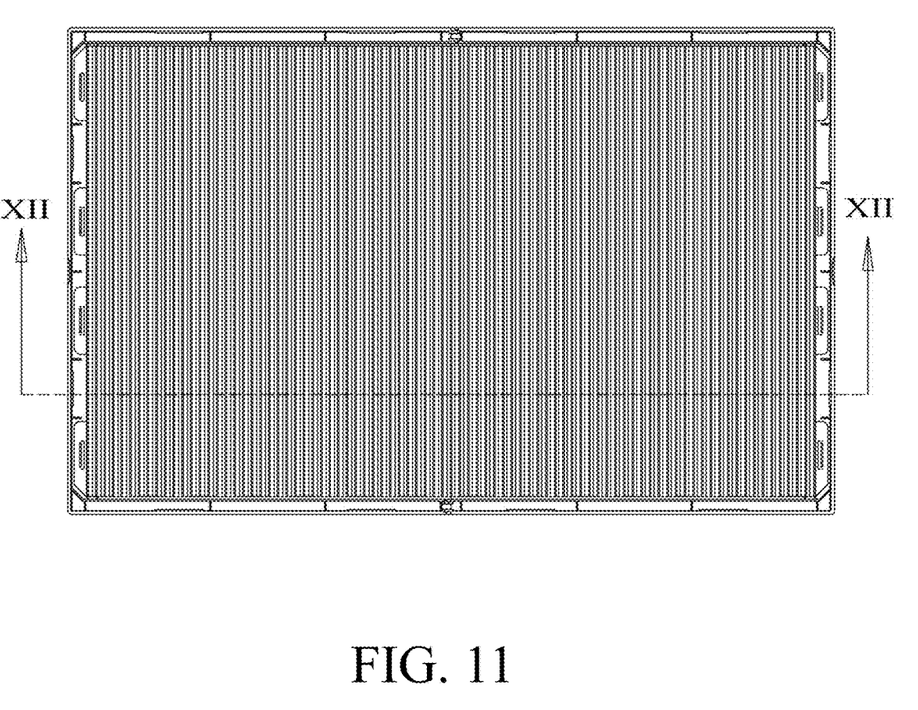
FIG. 11 is a structural schematic view of an outer frame and a filter cartridge in FIG. 1.
Figure 12:
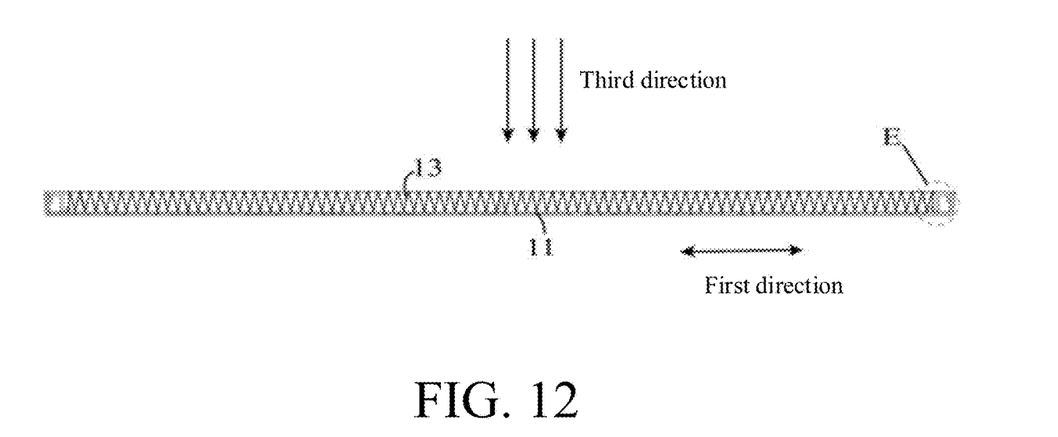
FIG. 12 is a cross-sectional view along line XII-XII in FIG. 11.
Figure 19:
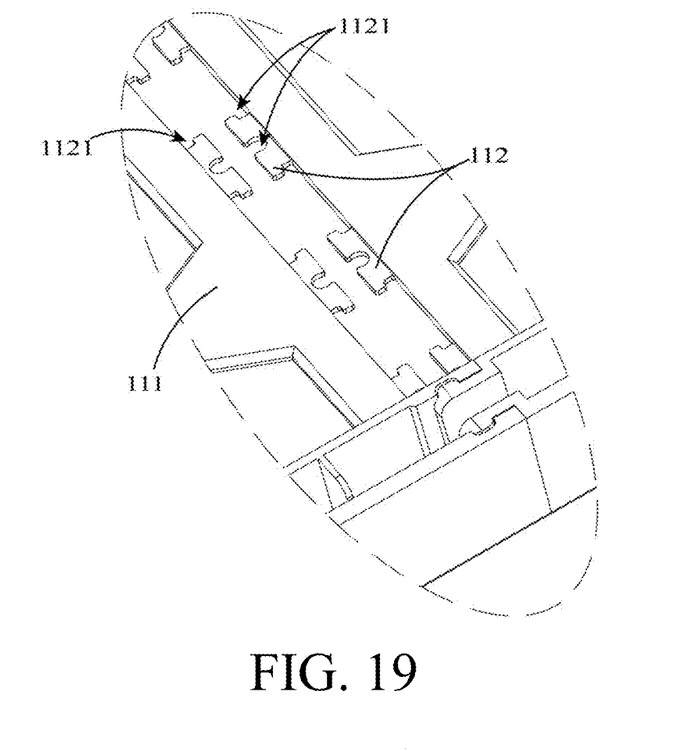
FIG. 19 is a partially enlarged view at area H in FIG. 17.

Further, referring to FIG. 6, FIG. 8, and FIG. 19, the thickness of the border portion 112 is less than the thickness of the side edge of the main casing 111; the connecting portion 12 is integrally injection molded with the border portion 112, and the connecting portion 12 fills an adhesive-hanging hole 1121. In this way, a stepped shape is formed between the side edge of the border portion 112 and the side edge of the main casing 111, which in turn provides a larger contact area and adhesive attachment points, thereby enabling a more robust connection between the casing 11 and the connecting portion 12. The border portion 112 defines the adhesive-hanging hole 1121, which may be each round, semi-circular, square, mushroom-shaped, etc. There may be one or more adhesive-hanging holes 1121. On the one hand, the adhesive-hanging hole 1121 may enhance the thickness of the adhesive and improve the adhesion and durability of the adhesive; on the other hand, the adhesive-hanging hole 1121 may enable the inside of the adhesion layer to form a certain air channel, which helps to uniformly penetrate and diffuse the adhesive in the adhesive hanging process, thereby improving the adhesive-hanging efficiency and ensuring that the thickness and quality of the adhesion layer are uniform and consistent.

Further, with reference to FIG. 6, the border portion 112 is provided in a stepped shape to include a thick-walled portion 1122 and a thin-walled portion 1123, where the main casing 111, the thick-walled portion 1122, and the thin-walled portion 1123 are connected sequentially in the first direction. The stepped shape of the border portion 112 helps to increase the contact area between the connecting portion 12 and the border portion 112, thereby increasing the adhesion force between them. The enhanced adhesion force helps to ensure that the connecting portion 12 is more tightly and stably attached to the border portion 112 and is less likely to fall off or be displaced.

Further, referring to FIGS. 3 and 6, the thick-walled portion 1122 defines the adhesive-hanging hole 1121, the adhesive-hanging hole 1121 being a stepped hole. The stepped holes reduce the risk of dislodgement of the connecting portion 12. Specifically, the different diameters or depths of the steps thereof provide more contact area and adhesive attachment points, such that the adhesive is less likely to come off after curing. This helps to ensure the durability and stability of the adhesive hanging effect and improves the life and reliability of the product.

Further, with reference to FIG. 6, the adhesive-hanging hole 1121 includes a large-hole segment 1124 and a small-hole segment 1125 distributed along the penetration direction, the hole diameter of the large-hole segment 1124 being greater than the hole diameter of the small-hole segment 1125, and the large-hole segment 1124 being notched along the first direction through the thick-walled portion 1122. The notch-shaped adhesive-hanging hole 1121 may more easily control the flow and direction of the adhesive injection, making the adhesive injection process more precise and controllable. In addition, the notch-shaped adhesive-hanging hole 1121 may further enhance the adhesion force between the connecting portion 12 and the border portion 112. The adhesive injection material forming the connecting portion 12 may better penetrate the tiny gaps between the large-hole segment 1124 and the small-hole segment 1125 through the notch-shaped adhesive-hanging hole 1121, forming a tighter bond with the border portion 112, thereby improving the overall firmness and durability.

In some embodiments, the two casings 11 in the same outer frame 10 are at an interval at least at the border portion 112, and the connecting portion 12 defines a folding slot 121 corresponding to the interval, the folding slot 121 extending along a rotation axis of the two casings 11. The folding slot 121 may be of a straight-line shape, a V-shaped shape, and the like. In a folded state, the folding slot 121 can reduce the gap between the two casings 11, or even make the two casings 11 folded to completely fit. In this way, the transport space may be saved and the two casings 11 may be prevented from being damaged after collision due to transport bumps.

In some embodiments, the filter cartridge 13 includes multiple filter units 131, the multiple filter units 131 forming a pleated shape in sequence, and thus the pleated filter cartridge 13 may increase the filtration area and improve the dust holding capacity of the filter cartridge 13. However, under the influence of external force/wind, the edge pleats of the pleated filter cartridge 13 are not easy to maintain but tend to flatten, which reduces the effectiveness of the filter cartridge 13.

The outer frame 10 is arranged with a support portion 15 in the accommodating space, the support portion 15 facing a most-marginal filter unit 131 and extending into between two adjacent filter units 131. The support portion 15 may support the filter cartridge 13 to maintain in a pleated state. The support portion 15 may be provided one or more than one, as appropriate.

In some embodiments, the support portion 15 is in the form of a plate. Referring to FIG. 11, FIG. 13, FIG. 14, and FIG. 16, at least one support block 151 is arranged proximate an edge of the outer frame 10. When the number of the at least one support block is plural, the support blocks 151 extend in a second direction and are distributed along the first direction, the second direction intersecting the first direction. The support blocks 151 may support the filter cartridge 13 to maintain the pleated state when the filter cartridge 13 is subjected to an external force. For example, in some embodiments, referring to FIGS. 2 and 13, a mounting lug 132 of the filter cartridge 13 is secured to a mounting base 20, and the filter cartridge 13 is subjected to extension by an external force. Without the support blocks 151, the pleats of the filter cartridge 13 will be reduced or even tend to spread. In the embodiments, since the support blocks 151 support a beveled surface of the filter cartridge 13, only a portion of the filter cartridge 13 between the support blocks 151 and the mounting base 20 undergoes extension.

Figure 5:
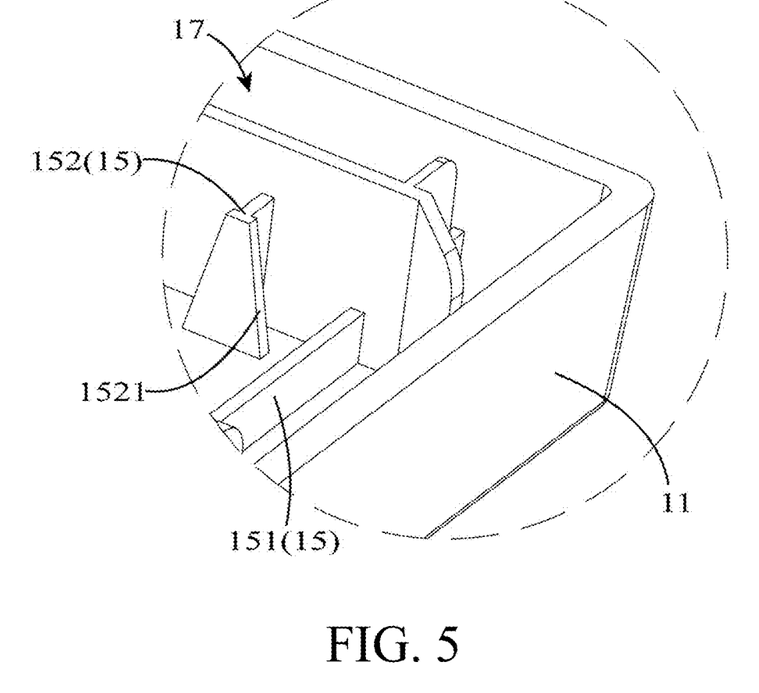
FIG. 5 is a partially enlarged view at area B in FIG. 3.
Figure 13:
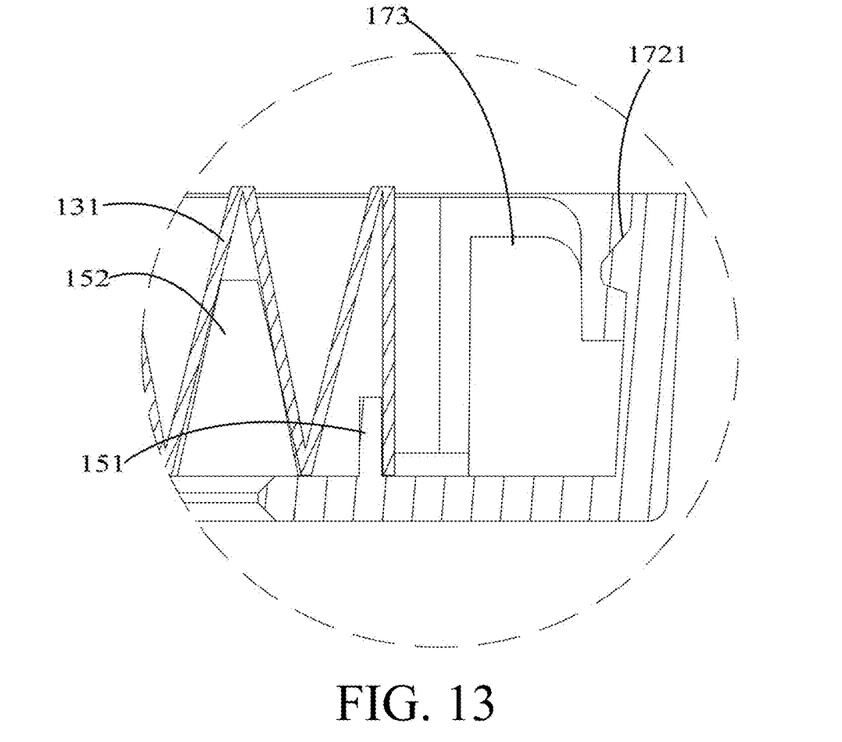
FIG. 13 is a partially enlarged view at area E in FIG. 12.
Figure 14:
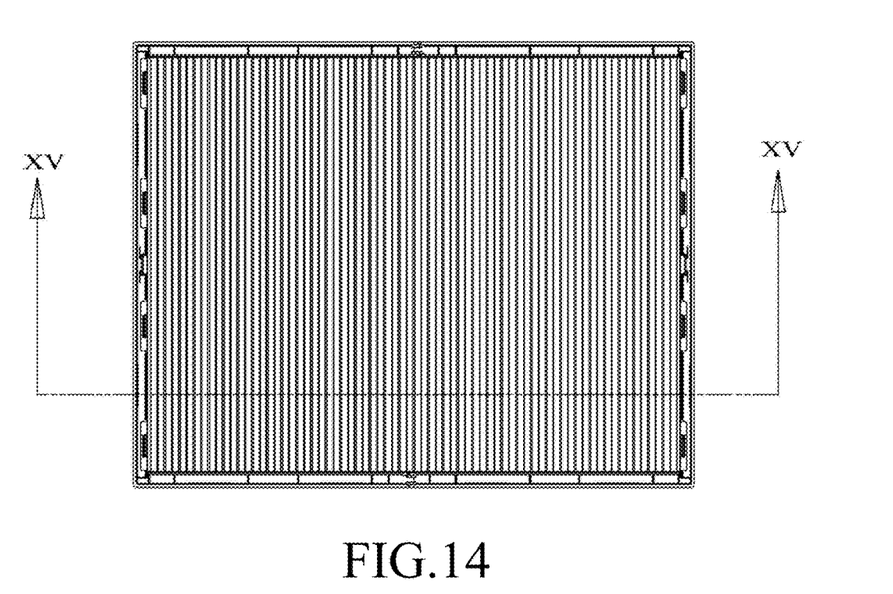
FIG. 14 is a structural schematic view of a foldable filter housing for an air conditioning according to other embodiments of the present disclosure.
Figure 15:
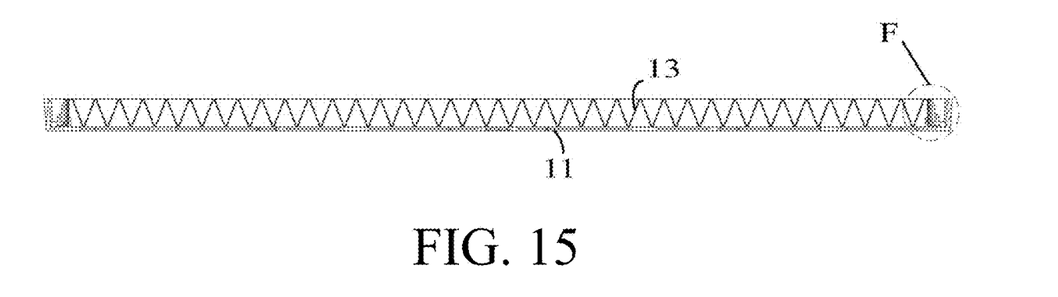
FIG. 15 is a cross-sectional view along line XV-XV in FIG. 14.
Figure 16:
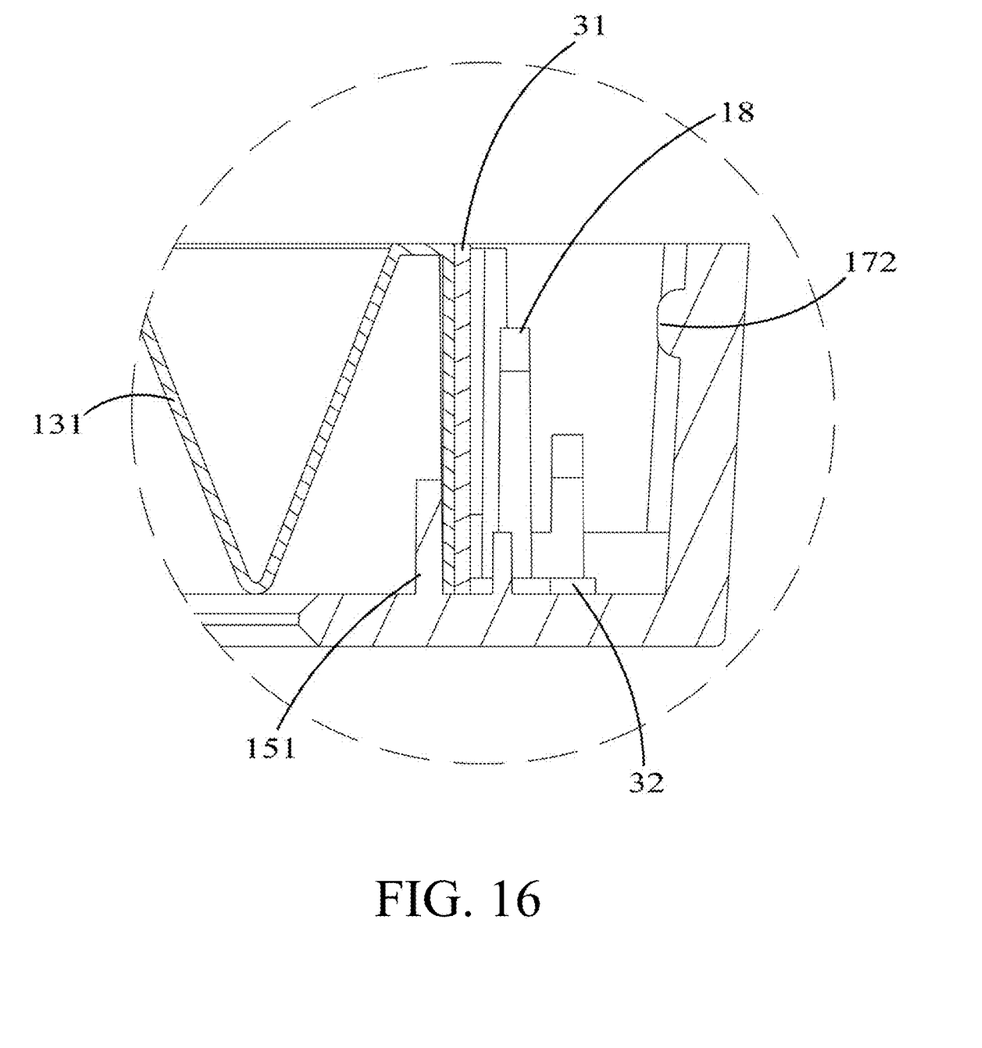
FIG. 16 is a partially enlarged view at area F in FIG. 15.
Figure 17:
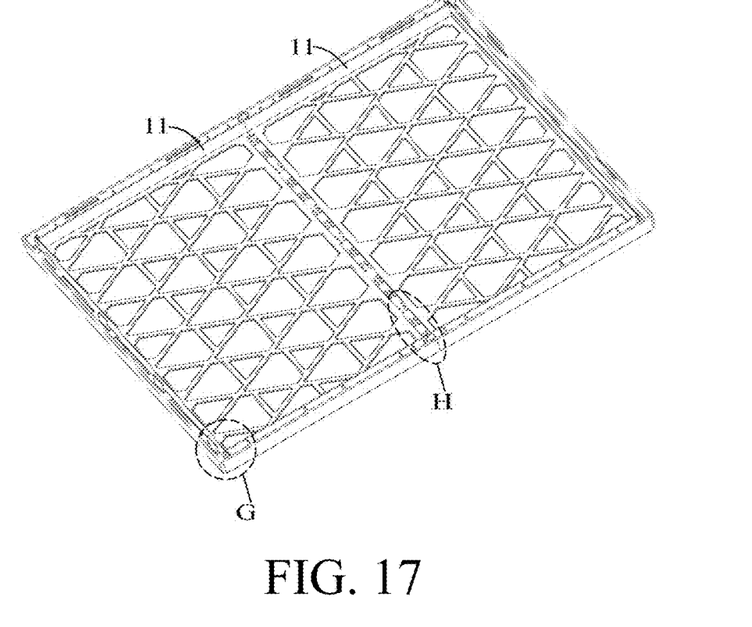
FIG. 17 is a structural schematic view of an outer frame in FIG. 14.
Figure 18:
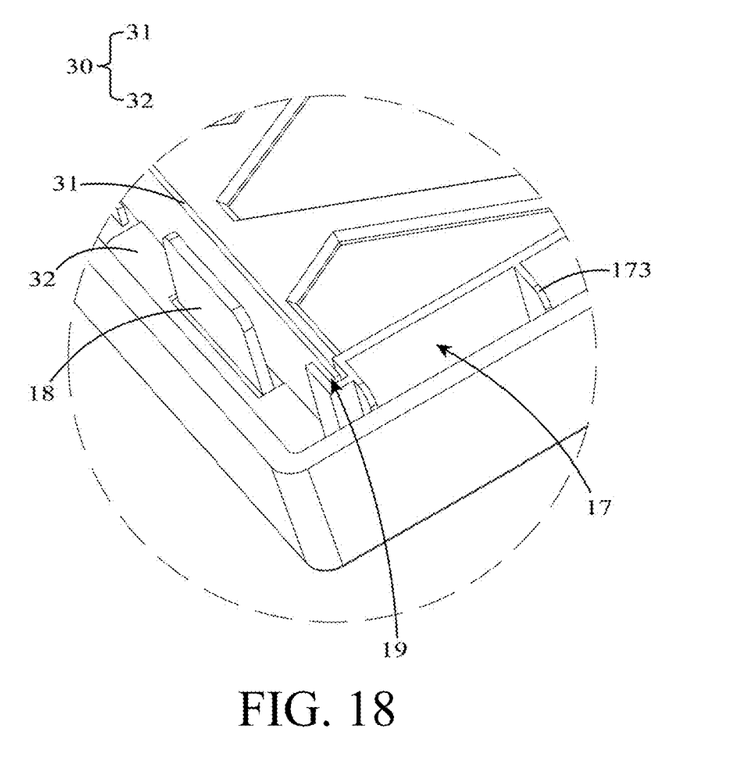
FIG. 18 is a partially enlarged view at area G in FIG. 17.

In some embodiments, two adjacent filter units 131 are connected to form a V-shape, and the support portion 15 includes two support beveled surfaces 1521 opposite to each other. Referring to FIGS. 3, 5 and 13, the two support beveled surfaces 1521 of a support block 152 are arranged facing the two adjacent filter units 131, and the inclined direction of each of the support beveled surfaces 1521 is same as the inclined direction of a corresponding filter units 131. When the filter element 13 is subjected to an external force (wind force) in the first direction or a third direction, the support beveled surfaces 1521 may support the beveled surfaces of a convex portion of the filter cartridge 13, such that the filter cartridge 13 is maintained in a pleated state.

Figure 7:
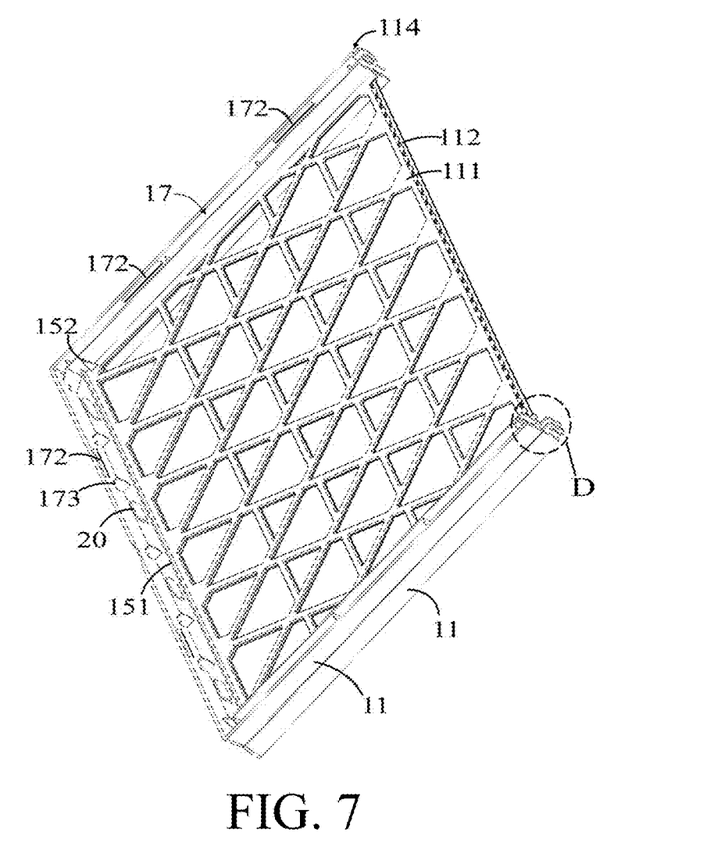
FIG. 7 is a folded state view of the outer frame in FIG. 3.

In some embodiments, referring to FIGS. 3, 7, and 8, the outer frame 10 has an unfolded state and a folded state, where the two casings 11 are unfolded relative to each other in the unfolded state, and the two casings 11 are folded relative to each other with the connecting portion 12 as the center in the folded state. One of the casings 11 is arranged with a clamping protrusion 113, and the other casing 11 defines a clamping slot 114. In the unfolded state, the clamping protrusion 113 is snap coupled with the clamping slot 114; and in the folded state, the clamping protrusion 113 and clamping slot 114 are disengaged.

The clamping protrusion 113 and clamping slot 114 allow the casings 11 connected through the connecting portion 12 to maintain a stable relative positional relationship in the unfolded state, thereby facilitating assembly of the foldable filter housing 100 by an installer. In some embodiments, referring to FIG. 2, the other outer frame 10 defines an avoidance notch 33 at a position corresponding to the clamping protrusion 113 and the clamping slot 114, and the cooperation between the avoidance notch 33 and the clamping protrusion 113 and clamping the slot 114 makes the foldable filter housing 100 compact, and thus optimizes the structural dimensions.

Figure 4:
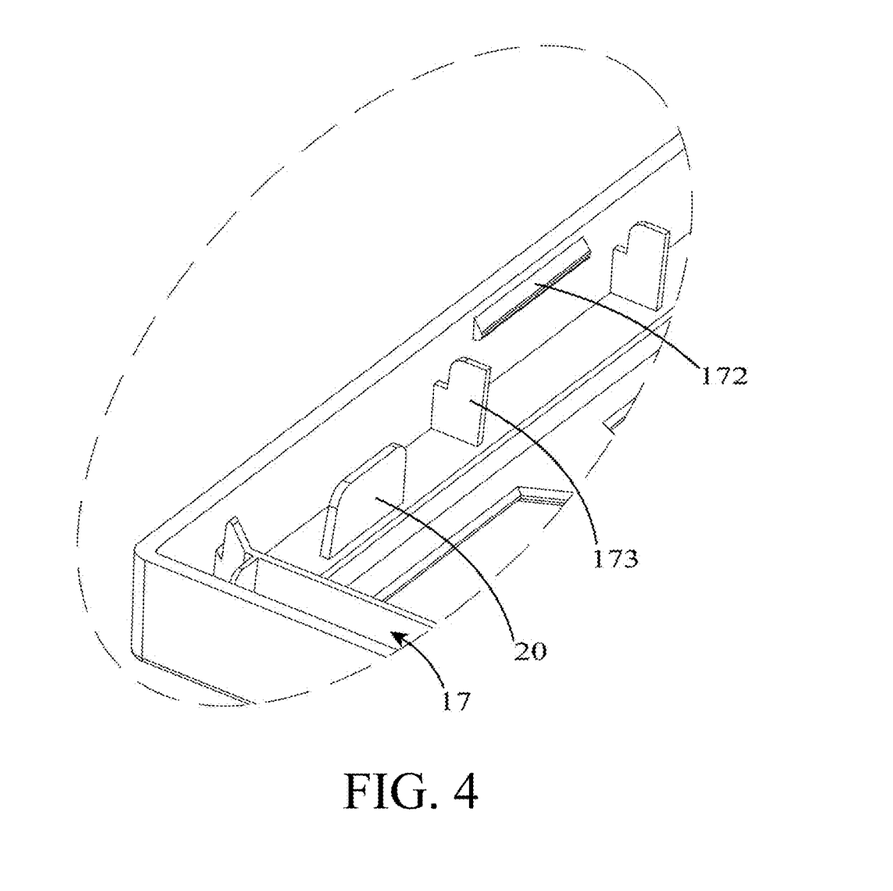
FIG. 4 is a partially enlarged view at area A in FIG. 3.

In some embodiments, referring to FIGS. 2, 4, and 13, one of the outer frames is a first outer frame, and the other outer frame is a second outer frame. In this case, the first outer frame defines a mounting slot 17, and an opening of the mounting slot 17 has a diameter increasing toward outside. In this way, a slot wall of the mounting slot 17 is beveled. The second outer frame closes the opening of the mounting slot 17 to define the accommodating space. When the two outer frames are closed, the slot wall of the mounting slot 17 has a guiding effect, which facilitates the mounting of the outer frames 10.

A side slot wall of the mounting slot 17 includes a fixing protrusion 172, which may be in the form of a semi-cylindrical shape, a trapezoidal shape, and the like. The other outer frame 10 defines a fixing slot 14 corresponding to the fixing protrusion 172. The fixing protrusion 172 and the fixing slot 14 are snapped together, which facilitates the formation of a stable accommodating space to receive the filter cartridge 13 and facilitates the removal of the filter cartridge 13 for replacing the filter cartridge 13. The fixing protrusion 172 is arranged with a guide beveled surface 1721 facing the opening, which facilitates the sliding of the fixing protrusion 172 into the fixing slot 14. In this way, one of the outer frames 10 can be nested in the other outer frame 10, which makes the foldable filter housing 100 relatively small in size, thereby saving the transport space of the foldable filter housing 100 and improving the transport efficiency.

In some embodiments, referring to FIG. 4, the mounting slot 17 is arranged with a limit plate 173, and a side of the limit plate 173 facing the second outer frame defines a limit notch. The second outer frame is arranged with an insertion plate 16, and the insertion plate 16 is socket with the limit notch when the second outer frame is covered with the first outer frame. In some embodiments, the connecting portion 12 is soft rubber. As the soft rubber has an elastic deformation capability, the second outer frame can wiggle within the second frame in the first direction when the second outer frame is covered with the first outer frame. The snap-fit between the limit plate 173 and the insertion plate 16 may limit the movement of the second outer frame in the first direction.

Referring to FIGS. 2 and 13, in some embodiments, the foldable filter housing 100 includes a mounting base 20, and the filter cartridge 13 is arranged with a mounting lug 132. The mounting lug 132 is sleeved on the mounting base 20 to secure the filter cartridge 13 to the outer frame 10.

Referring to FIGS. 14 to 18, in some embodiments, the foldable filter housing 100 includes a limit base 30; the limit base 30 includes a limit plate 31 and a tab 32 disposed at an angle, and the outer frame 10 is arranged with a fixing base 18 and a fixing slot 19. The tab 32 is sleeved on the fixing base 18, and the limit plate 31 is inserted into the fixing slot 19. An edge of the filter cartridge 13 is sandwiched between the support plate 151 and the limit plate 31.

Figure 20:
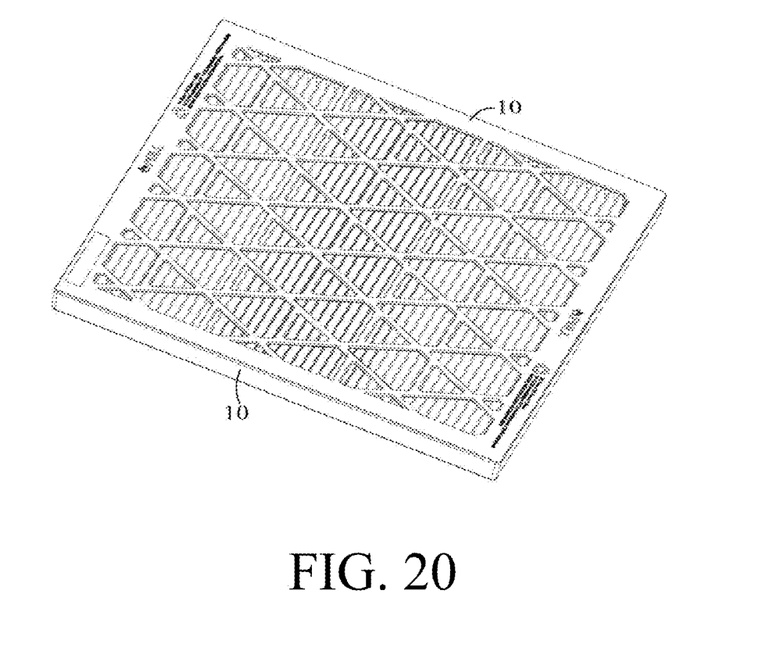
FIG. 20 is a structural schematic view of a foldable filter housing for an air conditioning according to further other embodiments of the present disclosure.
Figure 21:
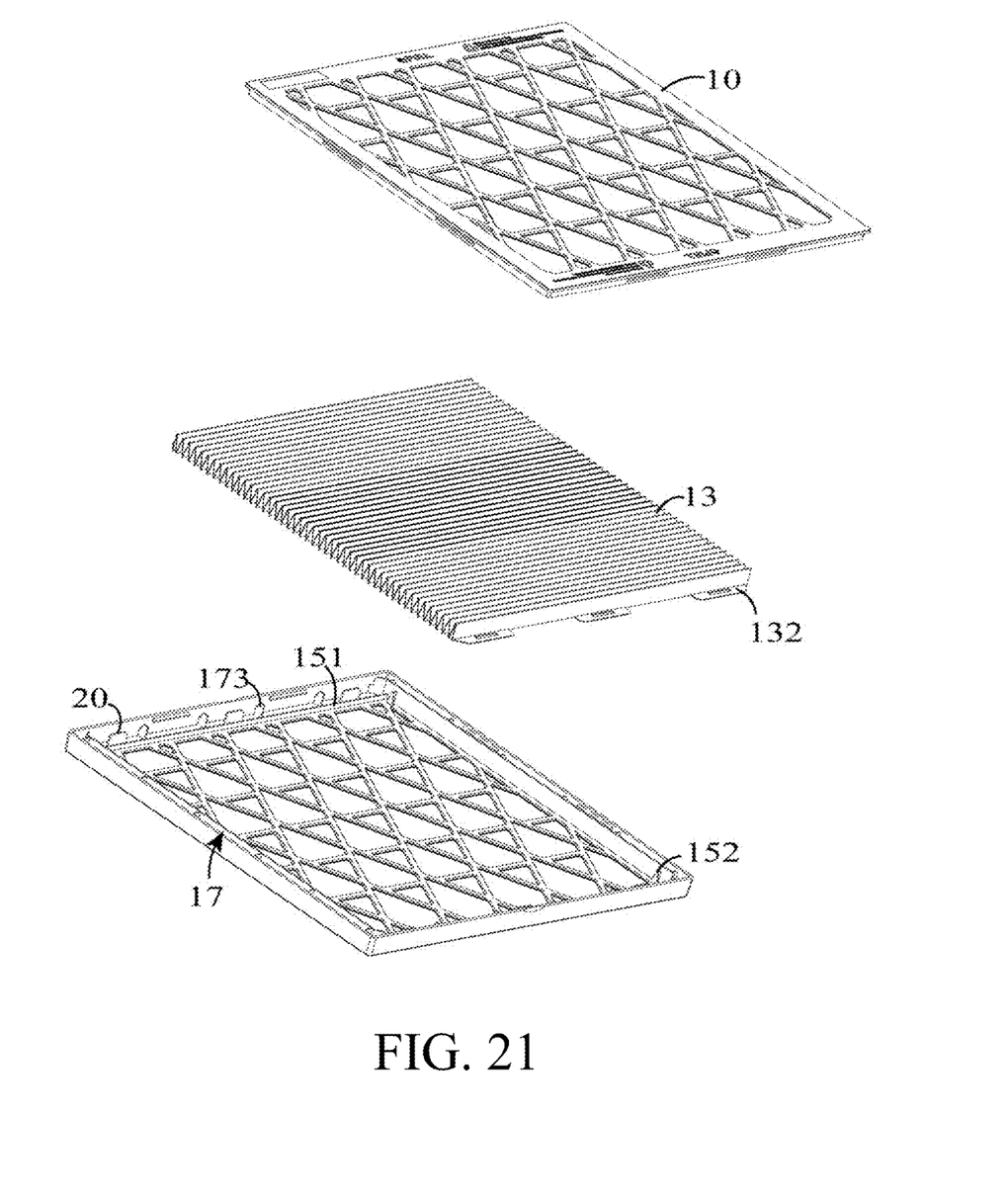
FIG. 21 is an exploded view of the filter housing in FIG. 20.

Referring to FIGS. 20 and 21, in some embodiments, the outer frame 10 does not have a folding function, but it has the technical features described above such as the support block 151, the support base 152, the mounting slot 17, the insertion plate 16, the clamping protrusion 113 and the clamping slot 114, the fixing protrusion 172, the fixing slot 14, etc.

Finally, it should be noted that the above embodiments are only intended to illustrate the technical solutions of the present disclosure, and not to limit them. Although the present disclosure has been described in detail with reference to the foregoing embodiments, those skilled in the art should understand that it is still possible to make modifications to the technical solutions recorded in the foregoing embodiments, or to make equivalent replacements for some of the technical features therein. These modifications or substitutions do not cause the essence of the technical solutions to depart from the spirit and scope of the technical solutions of the embodiments in the present disclosure.

What is claimed is:

1. A foldable filter housing for an air conditioning, comprising two outer frames stacked on each other; wherein each of the two outer frames comprises two casings and a connecting portion connecting the two casings, and the connecting portion is resilient to enable the two casings to fold relative to each other centered on the connecting portion;

wherein the two outer frames are detachably connected; an accommodating space is defined between the two outer frames for receiving a filter cartridge.

2. The foldable filter housing according to claim 1, wherein the connecting portion is a soft rubber; each of the two casings comprises a main casing and a border portion distributed in a first direction; the border portion is connected to a side edge of the main casing, and the connecting portion is integrally injection molded with the border portion.

3. The foldable filter housing according to claim 2, wherein a thickness of the border portion is less than a thickness of the side edge of the main casing; the border portion defines an adhesive-hanging hole, and the connecting portion is integrally injection molded with the border portion and fills the adhesive-hanging hole.

4. The foldable filter housing according to claim 3, wherein the border portion is in a stepped shape to include a thick-walled portion and a thin-walled portion; the main casing, the thick-walled portion, and the thin-walled portion are connected sequentially in the first direction.

5. The foldable filter housing according to claim 4, wherein the thick-walled portion defines the adhesive-hanging hole, the adhesive-hanging hole being a stepped hole.

6. The foldable filter housing according to claim 5, wherein the adhesive-hanging hole comprises a large-hole segment and a small-hole segment distributed along a penetration direction, a hole diameter of the large-hole segment being greater than a hole diameter of the small-hole segment, and the large-hole segment being notched along the first direction through the thick-walled portion.

7. The foldable filter housing according to claim 2, wherein the two casings are arranged at an interval at least at the border portion, and the connecting portion defines a folding slot corresponding to the interval, the folding slot extending along a rotation axis of the two casings.

8. The foldable filter housing according to claim 1, wherein the filter cartridge comprises a plurality of filter units, the plurality of filter units forming a pleated shape in sequence; each of the two outer frames is arranged with a support portion in the accommodating space, the support portion facing a most marginal one of the plurality of filter units and extending into between adjacent two of the plurality of filter units.

9. The foldable filter housing according to claim 8, wherein the support portion is in a form of a plate; or
the adjacent two of the plurality of filter units are connected to form a V-shape, and the support portion comprises two support beveled surfaces opposite to each other; wherein the two support beveled surfaces are arranged facing the adjacent two of the plurality of filter units, and an inclined direction of each of the two support beveled surfaces is same as an inclined direction of a corresponding filter unit.

10. The foldable filter housing according to claim 1, wherein each of the two outer frames has an unfolded state and a folded state; the two casings are unfolded relative to each other in the unfolded state, and the two casings are folded relative to each other centered on the connecting portion in the folded state;
one of the two casings is arranged with a clamping protrusion, and the other of the two casings defines a clamping slot; in the unfolded state, the clamping protrusion is snap coupled with the clamping slot; in the folded state, the clamping protrusion and clamping slot are disengaged.

11. The foldable filter housing according to claim 1, wherein one of the two outer frames is a first outer frame, and the other of the two outer frames is a second outer frame; the first outer frame defines a mounting slot, and an opening of the mounting slot has a diameter increasing toward outside; the second outer frame is configured to close and cover the opening of the mounting slot to define the accommodating space;
a side slot wall of the mounting slot comprises a fixing protrusion; the second outer frame defines a fixing slot at a position corresponding to the fixing protrusion; the fixing protrusion is arranged with a guide beveled surface facing the opening.

12. The foldable filter housing according to claim 11, wherein the mounting slot is arranged with a limit plate, and a side of the limit plate facing the second outer frame defines a limit notch; the second outer frame is arranged with an insertion plate, and the insertion plate is socket with the limit notch in condition of the second outer frame being covered with the first outer frame.

* * * * *